UNITED STATES PATENT OFFICE.

WILLIAM R. MACKLIND AND EDWARD C. HOLTON, OF CLEVELAND, OHIO, ASSIGNORS TO THE SHERWIN WILLIAMS COMPANY, OF CLEVELAND, OHIO, A CORPORATION OF OHIO.

INSECTICIDAL COMPOSITION.

1,244,453.     Specification of Letters Patent.     Patented Oct. 23, 1917.

No Drawing. Original application filed March 13, 1915, Serial No. 14,163. Divided and this application filed October 17, 1916. Serial No. 126,176.

*To all whom it may concern:*

Be it known that we, WILLIAM R. MACKLIND and EDWARD C. HOLTON, citizens of the United States, and residents of Cleveland, county of Cuyahoga, and State of Ohio, have jointly invented a new and useful Improvement in Insecticidal Compositions, of which the following is a specification, the principle of the invention being herein explained and the best mode in which we have contemplated applying that principle, so as to distinguish it from other inventions.

The present improvements, relating, as indicated, to an insecticidal composition have more particular regard to an insecticide made from a hitherto waste product, which when properly combined with other ingredients constitutes an effective and relatively inexpensive insecticidial composition. The present application is a division of our Patent No. 1,243,323 issued October 16, 1917, on application Serial No. 14,163, filed March 13, 1915. To the accomplishment of the foregoing and related ends, said invention, then consists of the ingredients hereinafter fully described and particularly pointed out in the claims.

The following description sets forth in detail one approved combination of ingredients embodying our invention, such disclosed means constituting, however, but one of various forms in which the principle of the invention may be used.

In the smelting of copper and other ores the fumes contain many compounds, chiefly oxids of zinc, lead, arsenic, iron, magnesium, etc., and sulfids and anhydrids of other elements. Heretofore, no use has been known for the recovered smelter fume and the present invention is intended for the purpose of utilizing this waste product.

The fumes from copper smelters are at present not only often entirely wasted, but when permitted to escape are very injurious to the health of the neighborhood surrounding the smelter, so much so in fact that several methods have been attempted to prevent the escape of these fumes. Smelter fumes vary in their composition according to the smelter from which they come, the main constituents being zinc oxid, arsenic compounds, lead oxid and sulfuric anhydrid, together with oxids, anhydrids and sulfids of many other metals in small or negligible quantities. In the usual fume there is approximately 40 per cent. of zinc oxid, 25 per cent. of sulfuric anhydrid, 10 per cent. of lead oxid, and approximately 10 per cent. of arsenic compounds.

In the production of the present invention, we preferably use smelter fume containing from ten to twenty-five per cent. of arsenic compounds by weight. If the percentage is less than ten, it may be increased by removing some of the other compounds, by leaching out the water soluble ones or by removing them in any preferred manner. If the arsenic content is greater than twenty-five per cent. it may be reduced by adding suitable materials such for example, as zinc or calcium oxid or hydroxid. More often, however, the recovered fumes of varying arsenic content may be mixed together to produce a product having an arsenic content within the desired limits.

This initial product must then be made safe for use and must be changed into a material that suspends well in water for use as a spray. This is effected by mixing with the recovered fume an amount of calcium oxid equal to about thirty per cent. of the weight of the arsenic content therein or an amount of calcium hydroxid equal to about forty per cent. of the weight of the arsenic content. In this manner we convert a heretofore dangerous and waste product into a valuable insecticide which is well adapted for use as a spray and very effective for the purpose desired.

Not only is our new insecticide effective but also the process of making the same is simple and relatively inexpensive, involving but few operations and being capable of employment without the necessity of providing expensive and complicated apparatus.

Other modes of applying the principle of our invention may be employed instead of the one explained, change being made as regards the materials employed, provided the ingredients stated by any of the following claims or the equivalent of such stated ingredients be employed.

We therefore particularly point out and distinctly claim as our invention:—

1. A composition of matter comprising an arsenic-containing recovered smelter fume dust in intimate intermixture with calcium oxid in amount less than one half the arsenic content of the fume.

2. A composition of matter comprising an arsenic-containing recovered smelter fume dust in intimate intermixture with calcium oxid in amount equal to 30 per cent. of the arsenic content of the fume.

Signed by us, this 12th day of October, 1916.

WILLIAM R. MACKLIND.
EDWARD C. HOLTON.